(12) United States Patent
DeMartinis et al.

(10) Patent No.: US 9,335,142 B2
(45) Date of Patent: May 10, 2016

(54) MARKING DEVICE FOR ATTACHING TO A TAPE MEASURE

(71) Applicants: John DeMartinis, Bethpage, NY (US); Anthony L. DeMartinis, Bethpage, NY (US)

(72) Inventors: John DeMartinis, Bethpage, NY (US); Anthony L. DeMartinis, Bethpage, NY (US)

(*) Notice: Subject to any disclaimer, the term of this patent is extended or adjusted under 35 U.S.C. 154(b) by 234 days.

(21) Appl. No.: 13/871,262

(22) Filed: Apr. 26, 2013

(65) Prior Publication Data

US 2014/0317943 A1    Oct. 30, 2014

(51) Int. Cl.
*G01B 3/10* (2006.01)

(52) U.S. Cl.
CPC ...... *G01B 3/1084* (2013.01); *G01B 2003/1089* (2013.01)

(58) Field of Classification Search
CPC ............ G01B 3/10; G01B 3/1084; G01B 2003/1089; G01B 3/1041; G01B 3/1071
USPC .................. 33/668, 666, 768, 770
See application file for complete search history.

(56) References Cited

U.S. PATENT DOCUMENTS

| | | |
|---|---|---|
| 1,394,992 A | 10/1921 | Fry |
| 2,026,768 A | 1/1936 | Aronson |
| 2,847,765 A | 8/1958 | Bateman |
| 3,871,100 A | 3/1975 | Hildebrandt |
| 4,015,337 A | 4/1977 | Taylor |
| 4,189,844 A | 2/1980 | Riggins, Sr. |
| 4,507,869 A | 4/1985 | Stude |
| 4,630,376 A | 12/1986 | Pentecost |
| 4,890,393 A | 1/1990 | St. Jean |
| 4,965,941 A | 10/1990 | Agostinacci |
| 4,999,924 A * | 3/1991 | Shields .................. 33/770 |
| D320,168 S | 9/1991 | Archer |
| 5,172,486 A * | 12/1992 | Waldherr ................ 33/770 |
| 5,671,543 A | 9/1997 | Sears |
| 5,815,939 A | 10/1998 | Ruffer |
| 5,992,038 A | 11/1999 | Harmon et al. |
| 6,178,655 B1 * | 1/2001 | Potter et al. ............. 33/668 |
| 6,487,783 B1 | 12/2002 | Thomas, Jr. |
| 6,497,050 B1 | 12/2002 | Ricalde |
| 6,663,153 B2 | 12/2003 | Brunson |
| 6,678,961 B1 | 1/2004 | Panahi |
| 6,698,104 B2 | 3/2004 | Scarborough |
| D488,729 S | 4/2004 | Golaszewski et al. |
| 6,804,898 B1 * | 10/2004 | Hsu .......................... 33/668 |

(Continued)

FOREIGN PATENT DOCUMENTS

EP    0013683 A1    8/1980

*Primary Examiner* — Yaritza Guadalupe-McCall
(74) *Attorney, Agent, or Firm* — Carter, DeLuca, Farrell & Schmidt, LLP

(57) ABSTRACT

Embodiments of a marking device are disclosed and described herein. The marking device of the various embodiments is configured for attaching to a tape measure, such as a tape measure which recoils within a housing. In one embodiment, the marking mechanism includes ink for marking the surface, whereas in another, alternate embodiment, the marking mechanism includes a scraper or other type of structure for marking the surface without the use of a chemical. When attached to the tape measure, the marking device is configured to slide along the tape measure when a force is applied thereto. At least one pointer is provided to indicate or point to a measurement along the tape measure. When the marking mechanism of the marking device is actuated to mark the surface, the surface is marked at a location which coincides with the measurement pointed to by the at least one pointer.

19 Claims, 3 Drawing Sheets

(56) References Cited

U.S. PATENT DOCUMENTS

| | | | |
|---|---|---|---|
| 6,839,981 B2 | 1/2005 | Rafter | |
| 6,892,469 B2 | 5/2005 | Tufts et al. | |
| 6,948,257 B1* | 9/2005 | Barr, Jr. | 33/528 |
| 6,996,915 B2 | 2/2006 | Ricalde | |
| 7,028,411 B1 | 4/2006 | Kasche | |
| 7,086,174 B2 | 8/2006 | Scarborough | |
| 7,269,913 B2 | 9/2007 | Holevas | |
| D632,987 S | 2/2011 | Wilson et al. | |
| 7,900,370 B1* | 3/2011 | Treige | 33/770 |
| 7,908,754 B2 | 3/2011 | Fritsch | |
| 8,196,308 B1 | 6/2012 | Baldi, Jr. | |
| 8,522,447 B1* | 9/2013 | Novotny | G01C 15/105 33/485 |
| 2001/0034953 A1* | 11/2001 | Cole, III | B43L 9/04 33/668 |
| 2006/0112583 A1* | 6/2006 | Sullivan | 33/770 |
| 2006/0288599 A1* | 12/2006 | Hajianpour | 33/755 |
| 2008/0098610 A1* | 5/2008 | Lipps | 33/770 |
| 2009/0090017 A1* | 4/2009 | Smiroldo | 33/770 |
| 2010/0000102 A1* | 1/2010 | Contreras | B43L 9/007 33/27.03 |
| 2012/0036727 A1* | 2/2012 | McCarthy | 33/760 |
| 2012/0055038 A1* | 3/2012 | Lindsay | 33/761 |
| 2014/0317943 A1* | 10/2014 | DeMartinis et al. | 33/668 |
| 2015/0052771 A1* | 2/2015 | Mamatkhan et al. | 33/701 |
| 2015/0075022 A1* | 3/2015 | Bitton et al. | 33/760 |

* cited by examiner

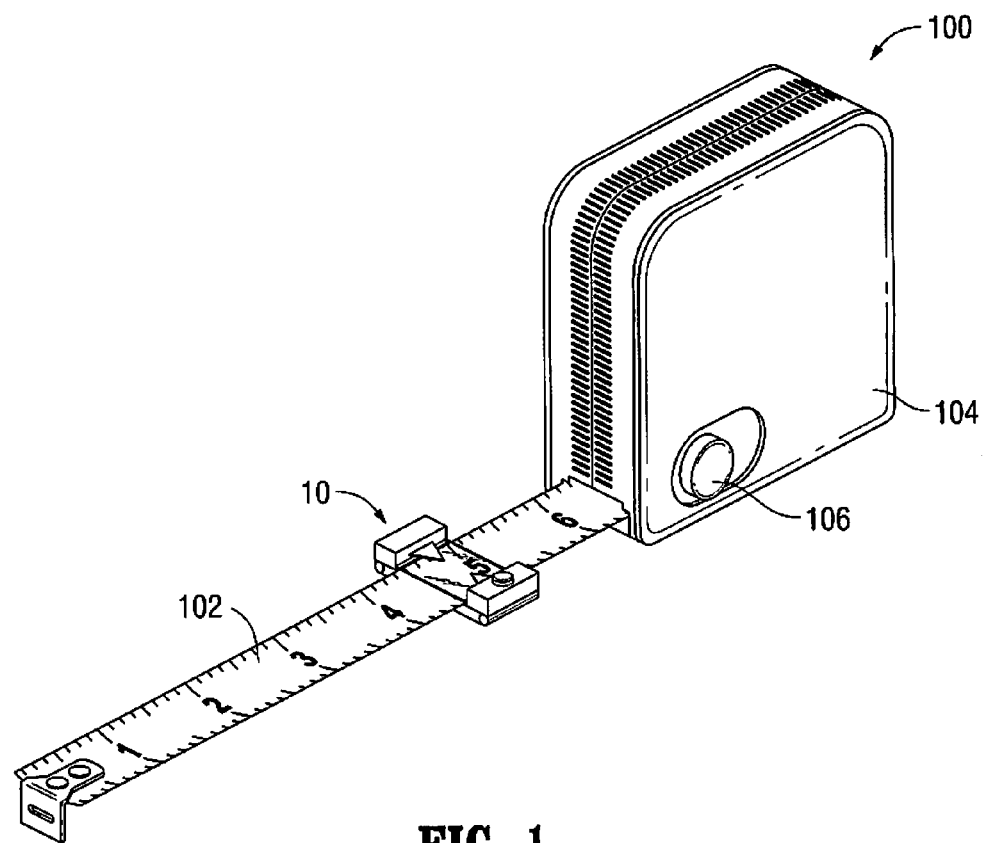
FIG. 1
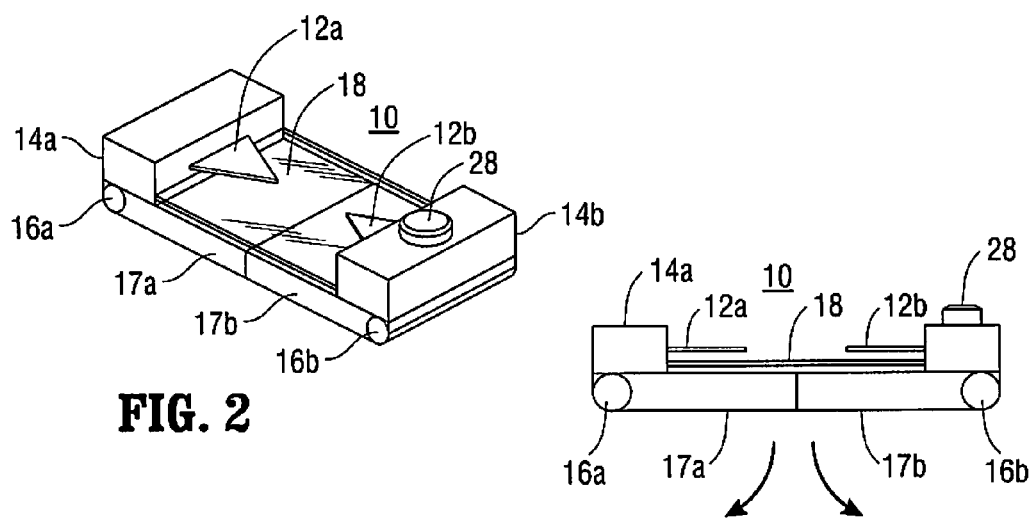
FIG. 2
FIG. 3

MARKING DEVICE FOR ATTACHING TO A TAPE MEASURE

BACKGROUND

1. Technical Field

The present disclosure relates generally to measuring devices; specifically, to a marking device for attaching to a tape measure.

2. Description of Related Art

Standard tape measuring devices are generally comprised of a span of ductile metal tape which is imprinted with either U.S. standard or metric units of measure of length and coiled around a housing-encased spool. A user retracts the tape from the housing, places the tape against a surface and measures out a desired span across the surface. It is often important for skilled craftsmen and the like to mark the surface at various specific and precisely measured distances.

Examination of the pertinent prior art reveals a number of marking attachments for measuring tapes. The prior art marking attachments incorporating a slide mechanism, for example, have used either an attached leading edge to etch a mark physically into the surface being measured (U.S. Pat. No. D320,168), or an attached guiding hole to aid the user in placing a mark on the surface so long as they are using a marking instrument that is separate and independent from the tape measure device itself, such as a pen or pencil (U.S. Pat. No. 4,507,869). These attachment devices fail to meet the need of the field: to enable a user of a tape measure to make precise marks upon a measured surface without marring the surface or requiring the user to access an independent marking instrument.

SUMMARY

Embodiments of a marking device are disclosed and described herein. The marking device of the various embodiments is configured for attaching to a tape measure, such as a tape measure which recoils within a housing. The marking device according to the various embodiments of the present disclosure is self-contained. The term "self-contained" is defined herein to mean that the marking device includes an attachment mechanism for attaching to the tape measure and also a marking mechanism for marking a surface.

In one embodiment, the marking mechanism includes ink for marking the surface, whereas in another, alternate embodiment, the marking mechanism includes a scraper or other type of structure for marking the surface without the use of a chemical. For example, the scraper can scrape, indent, etc. the surface when the scraper is compressed against the surface.

When attached to the tape measure, the marking device is configured to slide along the tape measure when a force is applied thereto. At least one pointer is provided to indicate or point to a measurement along the tape measure. When the marking mechanism of the marking device is actuated to mark the surface, the surface is marked at a location which coincides with the measurement pointed to by the at least one pointer.

More specifically, in one particular aspect of the present disclosure, there is provided a marking device for attaching to a tape measure. The marking device includes an attachment mechanism for attaching the marking device to the tape measure. The attachment mechanism includes at least one movable member configured for moving between an open position and a closed position; a plate; and at least one guide rail maintaining the plate substantially opposite the movable member. The at least one guide rail includes a hinge for pivoting the at least one movable member between the open position and the closed position. In the open position of the at least one movable member, the tape measure is provided in proximity to an underside of the plate and, in the closed position of the at least one movable member, the tape measure is sandwiched between the underside of the plate and the movable member for attaching the marking device to the tape measure.

The marking device further includes a marking mechanism for marking a surface. The marking mechanism includes a marking assembly housed within the at least one movable member; and an actuator in operative communication with the marking assembly for compressing the marking assembly against the surface during actuation of the actuator.

At least one pointer is provided in proximity to the at least one guide rail. The plate is transparent for viewing the tape measure through the plate. The marking assembly includes an ink pad and a marking point for marking the surface with ink. Alternatively, the marking assembly includes a scraper configured to mark the surface by non-chemical means.

The marking mechanism includes means for translating actuation of the actuator to movement of the marking assembly. The marking device further includes a door configured to move to an open position to reveal the marking assembly housed within the at least one movable member upon actuation of the actuator.

In another aspect of the present disclosure, there is provided a marking device for attaching to a tape measure. The marking device includes an attachment mechanism for attaching the marking device to the tape measure; and a marking mechanism. The marking mechanism includes a marking assembly; and an actuator retained by the attachment mechanism and in operative communication with the marking assembly.

The attachment mechanism further includes at least one guide rail. At least one pointer is provided in proximity to the at least one guide rail. The at least one guide rail includes a hinge for enabling movement of at least one movable member between an open position and a closed position. The actuator is positioned on the at least one guide rail.

The marking assembly includes an ink pad and a marking point for marking a surface with ink. Alternatively, the marking assembly includes a scraper configured to mark a surface by non-chemical means.

The marking mechanism includes means for translating actuation of the actuator to movement of the marking assembly. The marking mechanism further includes a door configured to move to an open position to reveal the marking assembly housed within the attachment mechanism. The attachment mechanism includes structure for enabling the marking device to slide along the tape measure after being attached to the tape measure.

BRIEF DESCRIPTION OF THE DRAWINGS

The advantages and features of the present disclosure will become more appreciated and better understood when considered in conjunction with the drawings:

FIG. 1 is a perspective view of a tape measure device showing an embodiment of the present disclosure attached to a measuring tape.

FIG. 2 is a top-side perspective view of an embodiment of the present disclosure in the closed position.

FIG. 3 is partial side view of an embodiment of the present disclosure in the closed position.

DETAILED DESCRIPTION

Figure 4:
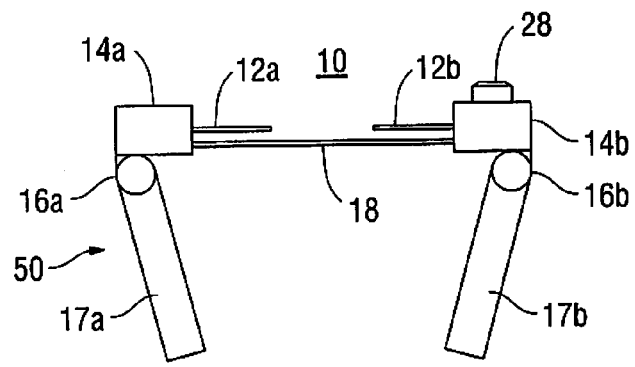
FIG. 4 is partial side view of an embodiment of the present disclosure in the open position.

In the Summary and Brief Description of the Drawings sections above, in this Detailed Description, in the Claims below, and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

The term "at least" means one or more than one. When, in this specification, a range is given as "(a first number) to (a second number)" or "(a first number) (a second number)," this means a range whose lower limit is the first number and whose upper limit is the second number. For example, 25 mm to 100 mm means a range whose lower limit is 25 mm, and whose upper limit is 100 mm.

FIG. 1 illustrates an exemplary tape measure 100 that includes measuring tape 102, housing 104, lock button 106, and an embodiment of the presently disclosed marking device 10 coupled or attached to measuring tape 102. In FIG. 1, the measuring tape 102 is shown extending from the tape measure 100. It is appreciated that other types of measuring tapes can be used in conjunction with marking device 10, such as a tailor's measuring tape which does not include a housing.

Marking device 10 is self-contained in that it includes structure for enabling the device 10 to be attached to a tape measure and it also includes structure for enabling the device to be used to mark a surface. The structure used to mark the surface, such as ink or other chemicals, scraper, etc., is enclosed within the marking device 10 as described herein. One of ordinary skill in the art can also appreciate within the spirit of the present disclosure that the structure used to mark the surface does not have to be enclosed within the marking device 10.

FIGS. 2 and 3 illustrate an embodiment of marking device 10, showing a set of triangulated pointers 12a and 12b attached, respectively, to the inside wall of guide rails or members 14a and 14b so as to have the narrow end of pointer 12a directed toward, and in the opposite direction of, the narrow end of pointer 12b. Guide rails 14a and 14b are connected to each other via transparent viewing plate 18 located underneath pointers 12a and 12b. Flaps or movable members 17a and 17b are connected to the underside walls of guide rails 14a and 14b, respectively, at hinges 16a and 16b, respectively.

Marking actuator 28 is located atop the outside top wall of the guide rail 14b and retained or held in position by the guide rail 14b.

FIG. 4 illustrates an embodiment of marking device 10, showing flaps 17a and 17b in the open position. Flaps 17a and 17b come together in the closed position by the use of manual force and will remain as such until manual force is exerted to separate flaps 17a and 17b from each other, thereby putting them in the open position. In the closed position, flaps 17a and 17b come together directly below, and parallel to, viewing plate 18 so as to leave just enough space between the viewing plate 18 and flaps 17a and 17b to allow a measuring tape 102 to slide perpendicularly through such space when a manual force is applied to device 10, while simultaneously allowing device 10 to remain friction fit against measuring tape 102 when no manual force is applied.

The guide rails 14a, 14b, flaps 17a, 17b, plate 18 are part of an attachment mechanism 50 for attaching the marking device 10 to the tape measure 102.

Figure 5A:
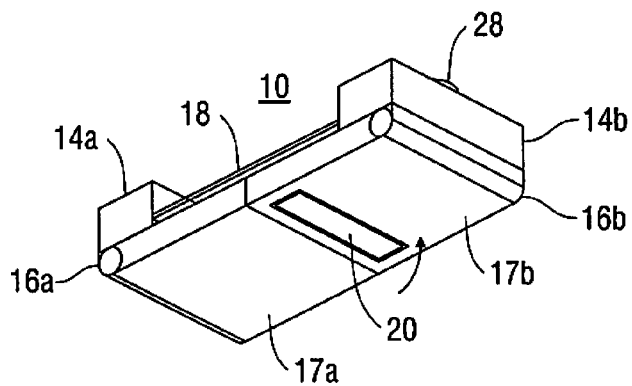
FIG. 5A is a bottom-side perspective view of an embodiment of the present disclosure in the closed position, with the marker unactuated.
Figure 5B:
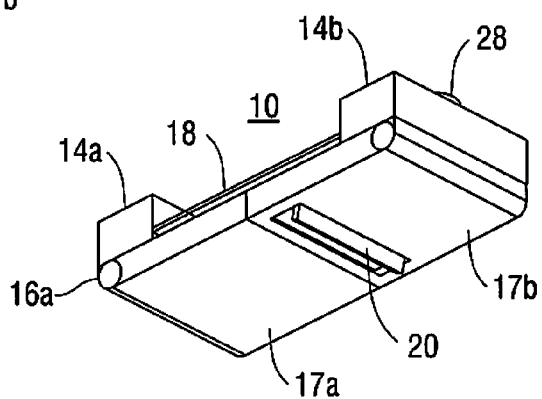
FIG. 5B is a bottom-side perspective view of an embodiment of the present disclosure in the closed position, with the marker actuated and unexposed.
Figure 5C:
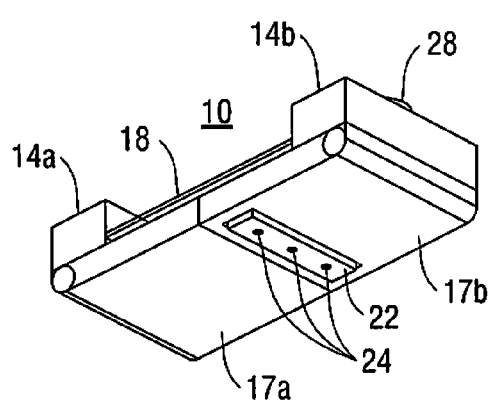
FIG. 5C is a bottom-side perspective view of an embodiment of the present disclosure in the closed position, with the marker actuated and exposed.

FIGS. 5A, 5B and 5C illustrate an embodiment of marking assembly 22 of marking mechanism 30 device 10.

FIG. 5A shows the underside wall of flap 17b having trap door 20 in the closed position and covering marking assembly 22 from exposure when actuator 28 has not been depressed.

FIG. 5B shows the underside wall of flap 17b having trap door 20 in the open position and exposing marking assembly 22 when actuator 28 has been partially depressed. As shown by the depiction of marking mechanism 30 in FIGS. 6A and 6B, depressing actuator 28 forces marking assembly 22 to project downward against the inside wall of trap door 20. Turning back to FIG. 5B, trap door 20 gives way to the force exerted by marking assembly 22 when actuator 28 is partially depressed by beginning to slide up and into the inner side wall of compartment 38 housing marking assembly 22 inside flap 17b.

FIG. 5C shows the underside wall of flap 17b having marking assembly 22 exposed when actuator 28 has been fully depressed. Trap door 20 gives way to the force exerted upon its inside wall by marking assembly 22 when actuator 28 is fully depressed by sliding up entirely into the inner side wall of compartment 38. Simultaneously, the bottom portion of marking assembly 22 protrudes outward from the underside of flap 17b while exposing marking point 24.

Figure 6A:
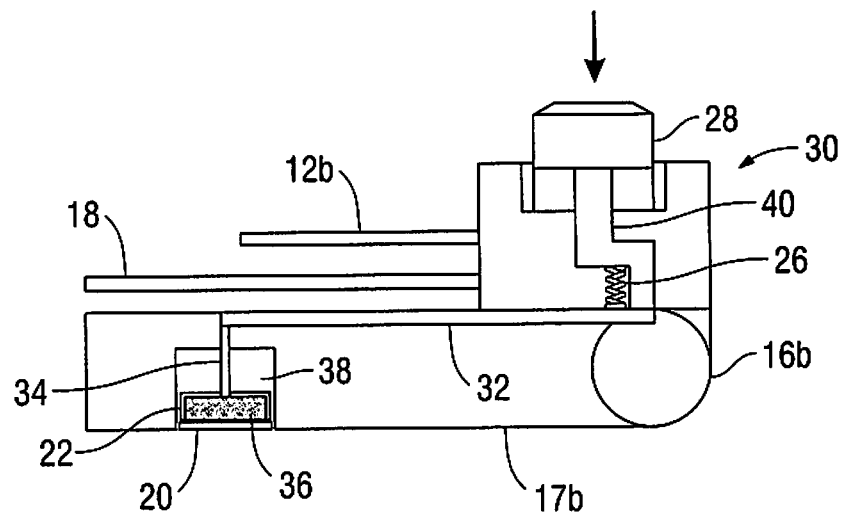
FIG. 6A is a cross-sectional, partial side view of an embodiment of the present disclosure in the closed position, with the marker unactuated.
Figure 6B:
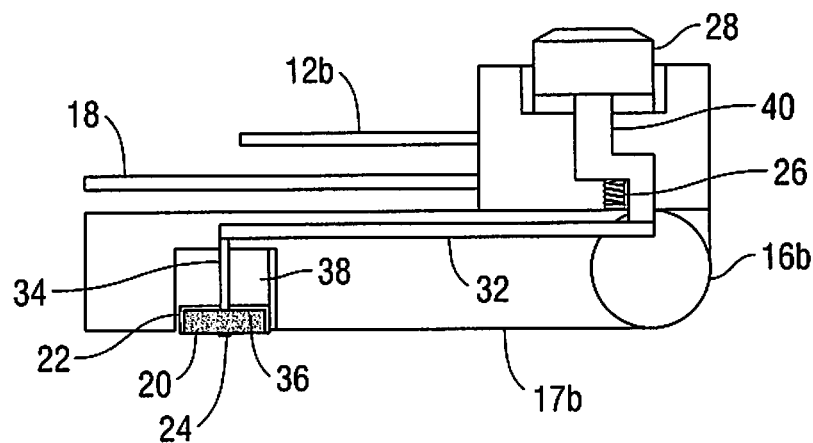
FIG. 6B is a cross-sectional, partial side view of an embodiment of the present disclosure in the closed position, with the marker actuated.

FIGS. 6A and 6B illustrate an embodiment of the marking mechanism 30 of device 10.

FIG. 6A shows mechanism 30 when actuator 28 has not been depressed. Protruding below the base of actuator 28 is "Z"-shaped actuating member 40 integral with the lever 32. Actuating member 40 descends vertically from the base of actuator 28 within guide rail 14*b* before, first, shifting horizontally therein and, then, shifting back down vertically where actuating member 40 contacts one end of lever 32. Bias spring 26 is enclosed between the horizontal shift portion of actuating member 40 and lever 32. Lever 32 runs in the horizontal direction parallel with flap 17*b*, is housed just inside the topside wall of flap 17*b*, and is connected to actuating member 40 on one end and to cross-bar 34 on the opposite end. Cross-bar 34 extends vertically from the opposite end of lever 32 to the top-center of marking assembly 22. In this state, marking assembly 22 is housed entirely inside compartment 38 of flap 17*b*, whereas marking point 24 is unexposed and covered by trap door 20.

FIG. 6B shows mechanism 30 when actuator 28 has been depressed. Actuating member 40 is forced down upon one end of lever 32 which causes cross-bar 34 to compress down upon marking assembly 22. When the underside of device 10, and, by implication, the underside of flap 17*b*, is pressed up against a surface (not shown) and actuator 28 is fully depressed, marking assembly 22 is forced out of compartment 38 inside flap 17*b* and becomes compressed against the surface.

The compression of marking assembly 22 against the surface consequently compresses ink pad 36 located within marking assembly 22, resulting in a marking agent (not shown) to be excreted out from ink pad 36 via marking point 24. Thereby, a mark is placed upon the surface at a point corresponding to a precise unit of measure identified on measuring tape 102 between pointers 12*a* and 12*b*. Spring 26 is bias in such a way that, when actuator 28 is released, spring 26 will recoil back to the position it was in prior to actuator 28 being depressed, thereby returning mechanism 30 to the state described in FIG. 6A.

In an alternate embodiment, marking assembly 22 is a scraper configured to scrape or leave an indent on a surface for marking the surface when compressed against the surface. Accordingly, this embodiment does not include ink pad 36.

Although the present disclosure has been described in considerable detail with reference to certain embodiments, other embodiments and versions are possible and contemplated. Therefore, the spirit and scope of the appended claims should not be limited to the description of the embodiments contained herein.

The invention claimed is:

1. A marking device for attaching to a tape measure, said marking device comprising:
    an attachment mechanism for attaching the marking device to the tape measure, the attachment mechanism comprising:
        at least one movable member configured for moving between an open position and a closed position;
        a plate; and
        at least one guide rail maintaining the plate substantially opposite the movable member and having a hinge for pivoting the at least one movable member between the open position and the closed position;
    wherein, in the open position of the at least one movable member, the tape measure is provided in proximity to an underside of the plate and, in the closed position of the at least one movable member, the tape measure is sandwiched between the underside of the plate and the movable member for attaching the marking device to the tape measure;
    a marking mechanism for marking a surface, the marking mechanism comprising:
        a marking assembly housed within the at least one movable member; and
        an actuator in operative communication with the marking assembly for compressing the marking assembly against the surface during actuation of the actuator.

2. The marking device according to claim 1, wherein at least one pointer is provided in proximity to the at least one guide rail.

3. The marking device according to claim 1, wherein the plate is transparent for viewing the tape measure through the plate.

4. The marking device according to claim 1, wherein the marking assembly comprises an ink pad and a marking point for marking the surface with ink.

5. The marking device according to claim 1, wherein the marking assembly comprises a scraper configured to mark the surface by non-chemical means.

6. The marking device according to claim 1, wherein the marking mechanism includes means for translating actuation of the actuator to movement of the marking assembly.

7. The marking device according to claim 1, wherein the hinge is positioned on a side of the at least one guide rail opposite a side of the at least one guide rail having the actuator.

8. The marking device according to claim 1, further comprising a door configured to move to an open position to reveal the marking assembly housed within the at least one movable member upon actuation of the actuator.

9. The marking device according to claim 1, wherein the actuator is positioned on the at least one guide rail.

10. The marking device according to claim 1, wherein the marking mechanism further comprises a spring.

11. A marking device for attaching to a tape measure, said marking device comprising:
    an attachment mechanism for attaching the marking device to the tape measure; and
    a marking mechanism comprising:
        a marking assembly; and
        an actuator retained by the attachment mechanism and in operative communication with the marking assembly, wherein the attachment mechanism comprises at least one guide rail, and wherein at least one pointer is provided in proximity to the at least one guide rail, wherein the attachment mechanism includes structure for enabling the marking device to slide along the tape measure after being attached to the tape measure.

12. The marking device according to claim 11, wherein the attachment mechanism comprises a transparent plate.

13. The marking device according to claim 11, wherein the marking assembly comprises an ink pad and a marking point for marking a surface with ink.

14. The marking device according to claim 11, wherein the marking assembly comprises a scraper configured to mark a surface by non-chemical means.

15. The marking device according to claim 11, wherein the marking mechanism includes means for translating actuation of the actuator to movement of the marking assembly.

16. The marking device according to claim 11, wherein the at least one guide rail includes a hinge for enabling movement of at least one movable member between an open position and a closed position.

17. The marking device according to claim 11, wherein the marking mechanism further comprises a door configured to move to an open position to reveal the marking assembly housed within the attachment mechanism.

18. The marking device according to claim 11, wherein the actuator is positioned on the at least one guide rail.

19. A marking device for attaching to a tape measure, said marking device comprising:

an attachment mechanism for attaching the marking device to the tape measure; and
a marking mechanism comprising:
 a marking assembly; and
 an actuator retained by the attachment mechanism and in operative communication with the marking assembly, wherein the attachment mechanism comprises a transparent plate, wherein the attachment mechanism includes structure for enabling the marking device to slide along the tape measure after being attached to the tape measure.

\* \* \* \* \*